United States Patent [19]
Henderson

[11] Patent Number: 5,375,744
[45] Date of Patent: Dec. 27, 1994

[54] DEVICE FOR DISPENSING GRANULAR MATERIAL

[75] Inventor: Larry E. Henderson, Rutherfordton, N.C.

[73] Assignee: Micro Measure, Inc., Forest City, N.C.

[21] Appl. No.: 199,463

[22] Filed: Feb. 22, 1994

[51] Int. Cl.⁵ .............................................. B65D 88/54
[52] U.S. Cl. ..................................... 222/306; 222/363
[58] Field of Search ................. 222/306, 307, 308, 363

[56] References Cited

U.S. PATENT DOCUMENTS

| | | | |
|---|---|---|---|
| 774,326 | 11/1904 | Kelly . | |
| 1,431,582 | 10/1922 | Hanson . | |
| 2,259,710 | 10/1942 | Stern | 222/306 X |
| 2,584,726 | 2/1952 | McOmber | 222/306 |
| 2,820,577 | 1/1958 | Winters et al. . | |
| 3,754,686 | 8/1973 | Karlen | 222/363 X |
| 4,079,860 | 3/1978 | Maves . | |
| 4,162,751 | 7/1979 | Hetland et al. . | |

Primary Examiner—Gregory L. Huson
Attorney, Agent, or Firm—Dority & Manning

[57] ABSTRACT

A device is provided for measuring and dispensing granular or powdered materials, such as coffee or powdered detergent. The device includes a body member which defines a hopper for receiving the granular material. The hopper includes a discharge opening and a discharge port disposed below the discharge opening. A dispensing cylinder is rotatably mounted in the body member between the hopper discharge opening and the discharge port. The cylinder is rotatable between a normally shut position and a fill position. The cylinder includes a first non-movable circumferential section which is maintained below the hopper discharge opening and the normally shut position of the cylinder. The cylinder includes a second movable circumferential section which is disposable below the discharge opening and the fill position of the cylinder. The second circumferential section is movable relative to the longitudinal axis of the cylinder and defines a variable volume cavity in the cylinder for receiving granular material from the hopper. A biasing device is configured with the cylinder to exert a constant closing force to maintain or return the cylinder to its normally shut position. An operable control device is configured with the second movable section of the cylinder so as to change the volume of the cavity which is presented to the discharge opening of the hopper. An operable turning device is also configured with the cylinder so that an operator can rotate the cylinder to its full position in opposition to the closing force of the biasing device. In this manner, granular material flows from the hopper into the cavity and, wherein, upon release of the turning device, the cylinder is caused by the biasing element to rotate to its normally shut position with any granular material carried in the cavity being dumped out through the discharge port.

10 Claims, 7 Drawing Sheets

DEVICE FOR DISPENSING GRANULAR MATERIAL

BACKGROUND OF THE INVENTION

The present invention relates to a device for dispensing granular or powdered material in measured quantities, such as coffee, laundry detergent, and the like.

Various devices are known in the art for dispensing measured quantities of granular or powdered material. For example, U.S. Pat. No. 4,079,860 discloses such a device incorporating a hopper disposed over a rotatable cylindrical valve member which defines a variable volume chamber. Another example includes U.S. Pat. No. 4,162,751 which discloses a measuring and dispensing apparatus adapted to be secured to a jar containing powdered or granular material. The device contains a rotor which includes an adjustable measuring compartment to receive the granular material from the jar. The rotor can be moved by way of a selector device from a filling position to a dispensing position. U.S. Pat. No. 774,326, U.S. Pat. No. 2,820,577, and U.S. Pat. No. 1,431,582 also disclose various other devices for dispensing a measured quantity of material.

The conventional devices, such as those described in the above mentioned patents, have proven to be inadequate for various reasons. For example, the rotating action of the rotor described in the '751 patent tends to continually compact the granular material between the cylinder edge and the discharge opening of the hopper. Also, the granular material eventually finds its way between the working surfaces of the rotor and body or hopper causing the mechanism to jam. The arrangement of the piston element defining the adjustable measuring compartment is such that the piston is moved always in opposition to the granular material, which will eventually cause the piston to jam.

Devices such as that disclosed in the '860 patent provide relatively complicated and inaccessible devices for changing the volume of the dispensing chamber. This device also has the distinct disadvantage that the material contained in the hopper portion would tend to become compacted.

The present invention provides an improved granular material dispensing apparatus which eliminates the disadvantages of the prior art devices.

OBJECTS AND SUMMARY OF THE INVENTION

It is a principal object of the present invention to provide an improved apparatus for dispensing a granular or powdered material in measured amounts.

A further object of the present invention is to provide a dispensing device having the capability of dispensing measured amounts of granular material without compacting the material or causing jamming of the working components of the device.

Additional objects and advantages of the invention will be set forth in part in the following description, or will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the device according to the invention for measuring and dispensing granular or powdered materials comprises a generally upright body member defining a hopper for receiving granular or powdered materials. The hopper has a receiving opening and a discharge opening. The body member further comprises a discharge port which is disposed below the hopper discharge opening. A measuring and dispensing cylinder is rotatably mounted in the body member between the hopper discharge opening and the body discharge port. The cylinder is rotatable about its longitudinal axis between a normally shut position and a fill position. The cylinder includes a first non-movable circumferential section which is disposed below the hopper discharge opening in the normally shut position of the cylinder. The cylinder includes a second circumferential section which is disposable below the discharge opening in the fill position of the cylinder.

The second circumferential section is movable relative to the longitudinal axis of the cylinder and thereby defines a variable volume cavity in the cylinder for receiving granular material from the hopper when the cylinder is rotated to its fill position. The device further includes a biasing device which is operably connected to the cylinder. This biasing device exerts a closing force upon the cylinder to maintain or return the cylinder to its normally shut position. The device also includes an operable control device which is configured with the second circumferential section to move this section and thereby change the volume of the variable volume cavity as the cylinder is maintained in its normally shut position. An operable turning device is also configured with the cylinder and defines an element whereby an operator can grasp and rotate the cylinder to the fill position in opposition to the closing force of the biasing device wherein granular material flows from the hopper into the variable volume cavity. Upon release of the turning device, the cylinder is caused by the biasing element to rotate to its normally shut position whereby any granular material carried in the cavity is subsequently dumped out through the discharge port of the body.

In a preferred embodiment of the invention, the hopper is generally funnel shaped and tapered between its receiving opening and discharge opening. In this embodiment, the variable volume cavity has an opening which is wider in the radial direction than the hopper discharge opening. In this manner, the granular material cannot build up and become compacted inside of the hopper.

In a further preferred embodiment of the invention, the cylinder comprises at least one rack and pinion mechanism carried therein for changing the volume of the cavity of the cylinder. In this embodiment, the control device may further include a knob connected to a shaft extending through the cylinder, the knob configured to be grasped by an operator for rotating an attached pinion relative to the rack, thereby moving the second circumferential section of the cylinder. It may also be preferred in this embodiment to include a ratchet device within the cylinder for maintaining the relative position of the second section of the cylinder relative to the first section once the volume of the cavity has been defined by the operator turning the knob.

In yet a further preferred embodiment of the invention, the body member comprises a front cover having a circular slot defined therethrough. The turning device in this embodiment comprises a plate which is rotatably mounted on the front cover with a projection extending through the slot and engaging the cylinder. The plate and cylinder are rotatable through the arc defined by the slot in the front cover. In this embodiment, the biasing device may comprise a spring element attached to the front cover and the plate.

The device according to the present invention may comprise any number of commercial embodiments. For example, the device may comprise a coffee dispenser being sized so as to provide measured quantities of coffee into the baskets of automatic coffee makers. In another preferred commercial embodiment, the device may be configured as a powdered material dispenser, such as powdered laundry detergent, or the like.

The accompanying drawings, which are incorporated in and constitute a part of this specification, illustrate embodiments of the invention and, together with the description serve to explain the principles of the invention.

DESCRIPTION OF THE PREFERRED EMBODIMENTS

Figure 1:
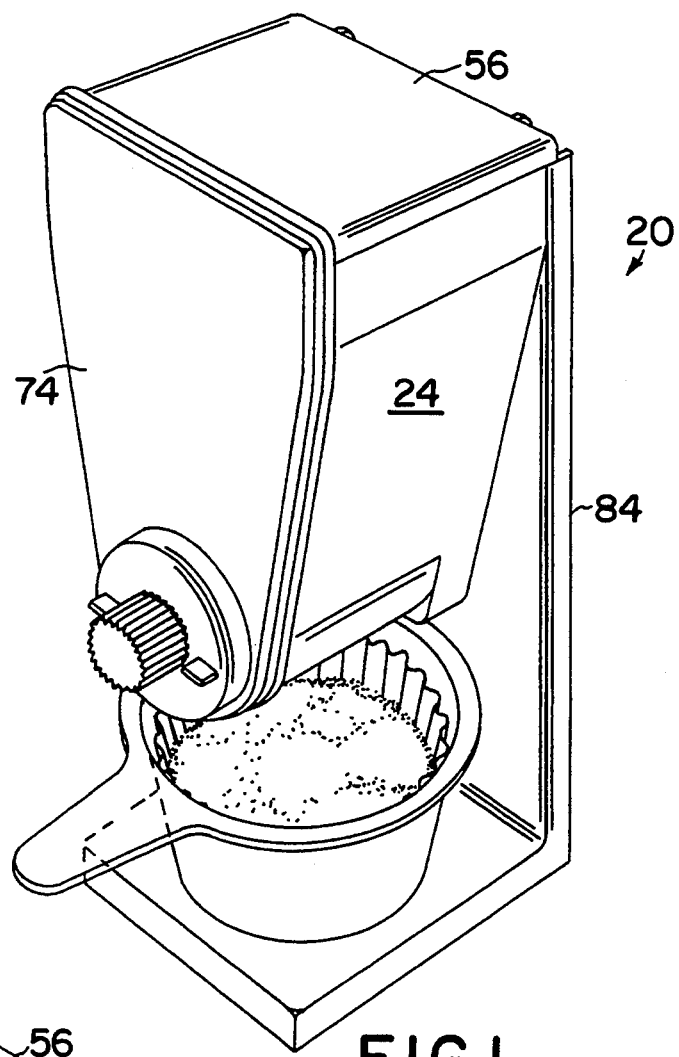
FIG. 1 is a perspective view of an embodiment of the present invention illustrated as a coffee dispenser.

Reference will now be made in detail to the presently preferred embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components and the drawings is consistent throughout the application with the same components having the same number in each of the drawings.

In accordance with the invention, a device is provided for measuring and dispensing granular or powdered materials. It should be understood that the device is not limited to any particular sort of material and may be configured for dispensing coffee, powdered detergents, or any other manner of like materials. For ease of explanation, and by way of example only, the device will be described as a coffee dispenser. Also, it should be understood that the components of the apparatus may be formed of any suitable material. For example, the components may be formed of cast aluminum parts, molded plastic parts, or any other suitable type material. The invention is not limited to any particular type of material. Also, the general shape and appearance of the apparatus as illustrated in the drawings is by way of example only and is not meant to limit the invention in any way.

Figure 2:
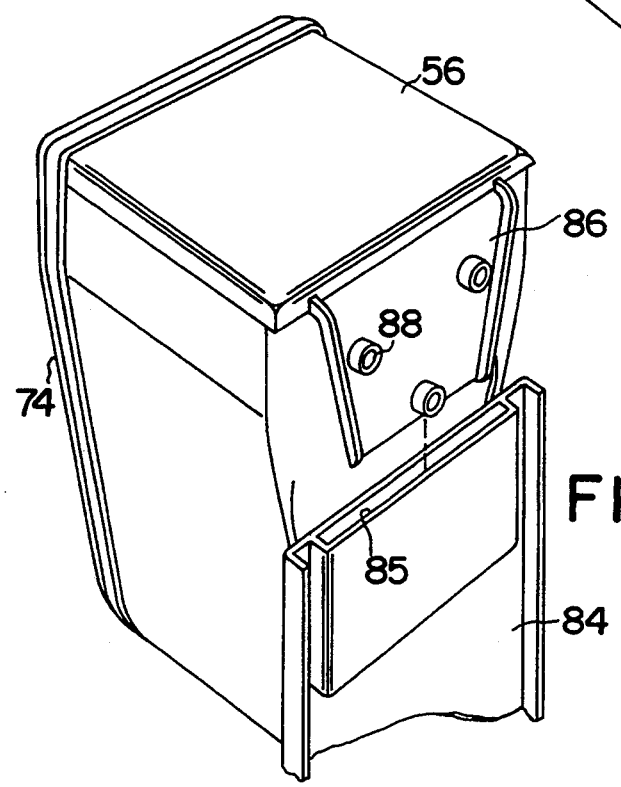
FIG. 2 is a back view of the embodiment illustrated in FIG. 1.

Referring to FIGS. 1 through 5 in particular, device or apparatus 20 for measuring and dispensing granular or powdered materials includes a generally upright body member 24. Body member 24 is generally upright in that it may be attached to a stand 84, as illustrated in FIGS. 1 and 2. In FIG. 2, body member 24 includes a mounting bracket 86 which may be attached directly to the body or to a cover 56 which fits upon body 24. Mounting bracket 86 slides into a receiving slot 85 configured in stand 84. It should be understood that body 24 may be formed integral with stand 84, or may be removably attached thereto by any manner of conventional means.

Figure 3:
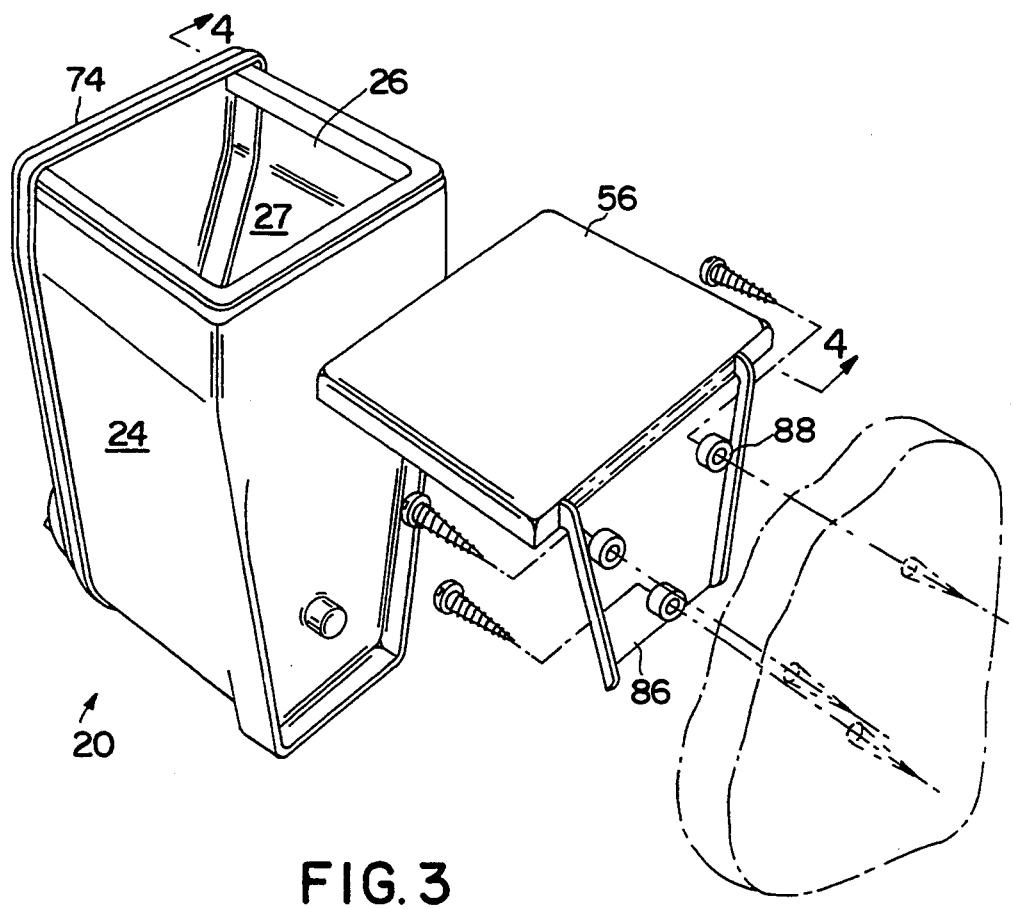
FIG. 3 is a partial component view of the apparatus particularly illustrating the wall mounting feature thereof.
Figure 4:
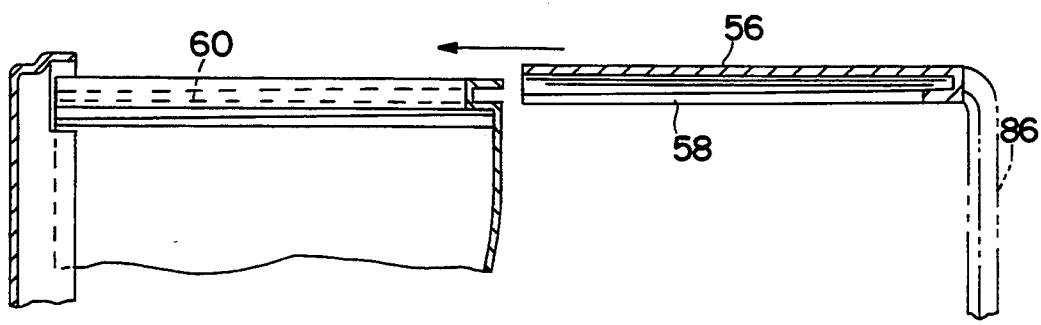
FIG. 4 is a cut-away side view taken along the lines indicated in FIG. 3 particularly illustrating the seal between the top and cover of the apparatus.

In an alternative embodiment particularly illustrated in FIG. 3, bracket 86 includes mounting holes 88 for mounting body 24 directly to a wall.

Body 24 includes a cover 56 which is removable and provides access to a hopper 26 defined within body 24. Preferably, cover 56 is slidable onto body 24 by way of tapered flange member 58 defined therein which slidably fit into tapered slot 60 formed on the upper edge of body member 24. This aspect of the invention is particularly illustrated in FIGS. 4 and 5. The tapered slot and flange configuration provides for an essentially air-tight connection between top 56 and body 24. However, it should be understood that any manner of conventional means may be utilized to attach top 56 with body 24.

Body 24 also includes a front cover 74 fitted thereon. Front cover 74 may be formed integral with body 24 or may be removably detached thereto. In a preferred embodiment of the invention, and for ease of manufacture, most of the components thereof are separately formed and removably attached to one another to form device 20.

Figure 5:
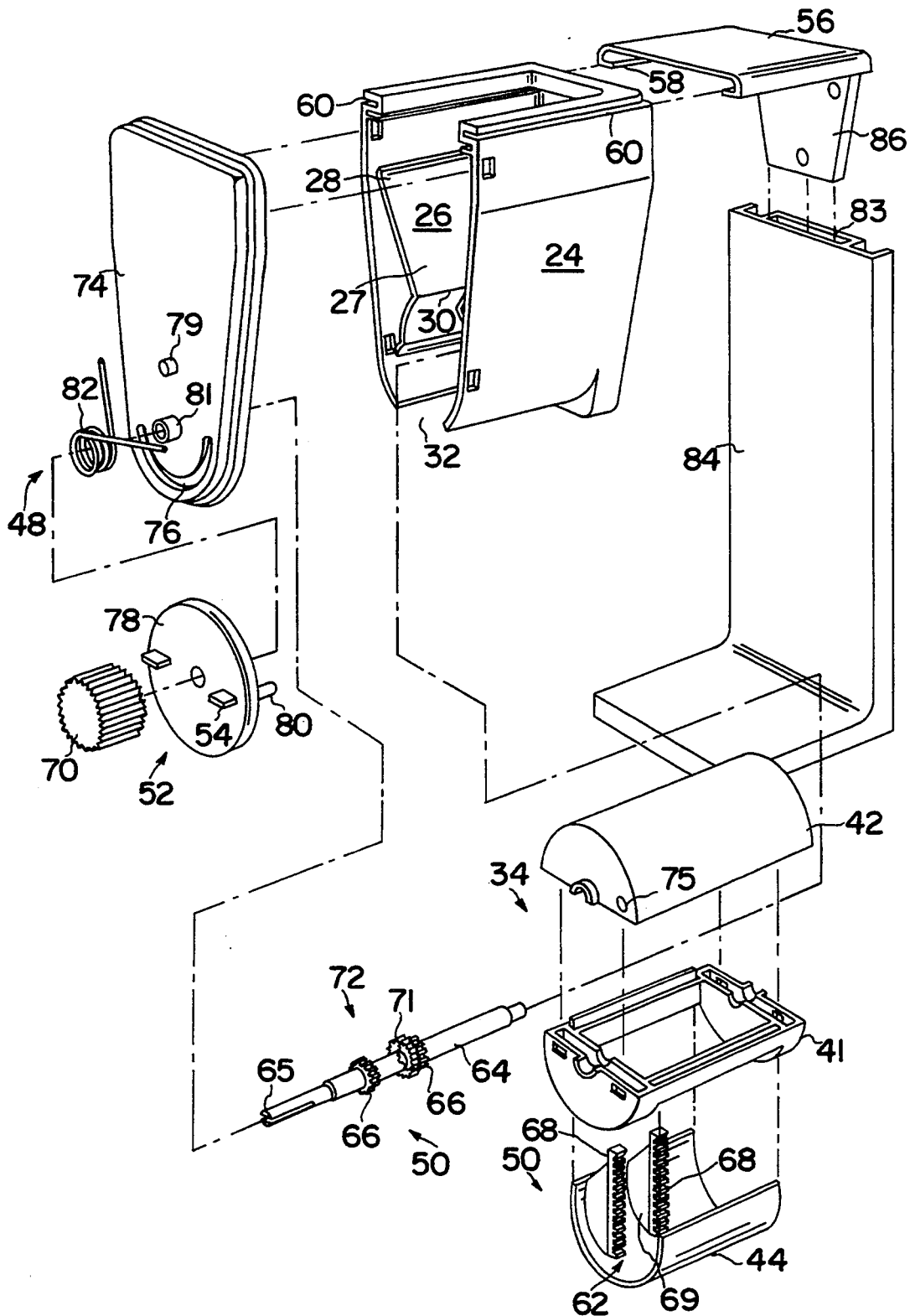
FIG. 5 is an exploded component view of the apparatus according to the invention.

As mentioned above, and as particularly shown in FIGS. 3 and 5, body 24 defines a hopper 26 therein. Hopper 26 may be defined by side panels 27 and is configured to receive granular material which is poured into hopper 26 upon removing cover 56. Hopper 26 defines a receiving opening 28 for receiving granular material, and a discharge opening 30 for dispensing granular material. In a preferred embodiment of the invention, hopper 26 is generally funnel shaped, as shown in FIG. 5, and is tapered between its receiving opening and discharge opening. In an alternative embodiment, hopper 26 may be conical, for example.

Device 20 also includes a measuring and dispensing cylinder, generally 34, which is rotatably mounted in body member 24 between discharge opening 30 of hopper 26 and a discharge port 32 defined by body 24. Discharge port 32 is clearly shown in FIG. 5. It should be understood that discharge port 32 identifies an opening by way of which granular material is eventually discharged from apparatus 20. Port 32 may be defined as an opening in cylinder 34 or may be defined by structure incorporated in body 24.

Cylinder 34 is rotatable about its longitudinal axis within body member 24. Cylinder 34 is rotatable between a normally shut position and a fill position. Cylinder 34 is normally maintained in its shut position and may be rotated by an operator to a fill position, as will be described below.

Cylinder 34 comprises a first non-movable circumferential section 42 which is normally disposed below hopper discharge opening 30 in the normally shut position of the cylinder. Section 42 is non-movable in that it is stationary with respect to the longitudinal axis of cylinder 34. Thus, in the normal stable state of the apparatus, granular material 22 held within hopper 26 is presented to first circumferential section 42. Cylinder 34 also includes second circumferential section 44 which is generally opposite first section 42 and is disposable below discharge opening 30 when cylinder 34 is rotated to its fill position. Second section 44 is movable relative to the longitudinal axis of the cylinder and defines a variable volume cavity 46 in cylinder 34 for receiving granular material 22 from hopper 26. In other words, second circumferential section 44 is moved relative to the longitudinal axis of the cylinder while the cylinder is maintained in its normal shut position relative hopper 26. Circumferential section 44 is movable over a range of movement so that the volume of cavity 46 can be defined to correspond to any number of pre-measured quantities. Once cavity 46 has been defined as desired, cylinder 34 is rotated about its longitudinal axis until cavity 46 is placed below discharge opening 30. Granular material 22 then flows into cavity 46. Upon release of cylinder 34 by the operator, the cylinder automatically returns to its normally shut position causing cavity 46 to be rotated to discharge port 32 thereby dispensing granular material 22 to an appropriate container placed below the discharge port.

In a preferred embodiment of the invention, variable volume cavity 46 is generally opposite of the first non-movable circumferential section 42 with discharge port 32 being opposite of discharge opening 30 defined by hopper 26. This embodiment is preferred in that granular material 22 is discharged or dumped from the apparatus when cavity 46 is essentially in a straight up and down or vertical position. Applicant has determined that, for certain granular materials, a certain discharge angle is required to ensure that material 22 is completely discharged from the device. When the discharge port and cavity are aligned so that material is dumped from the device at an angle of 90 degrees with respect to a horizontal through the device, granular material 22 is insured of being completely discharged from the device. Body member 24 and, thus, discharge port 32 are disposed at a sufficient height so that a receptacle, such as the coffee basket illustrated in FIG. 1, may be placed below discharge port 32. Although the embodiment just described is preferred, it should be understood that the invention is not limited to this configuration. For example, discharge port 32 may be at some angle less than 90 degrees with respect to horizontal whereby material 22 is dumped from cavity 46 without being rotated completely opposite discharge opening 30.

Figure 8:
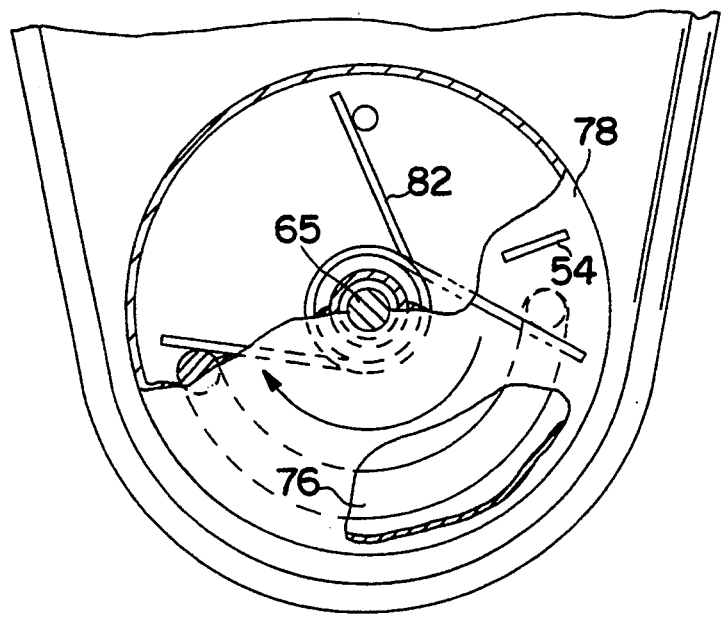
FIG. 8 is a view of the apparatus taken along the lines indicated in FIG. 6 particularly illustrating the biasing element.
Figure 9:
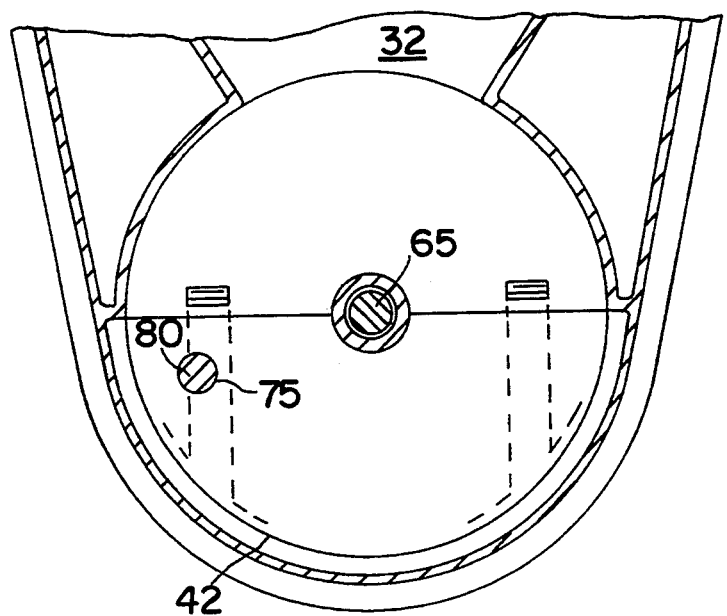
FIG. 9 is a view of the apparatus taken along the lines indicated in FIG. 6 illustrating the respective halves or sections of the rotating cylinder.
Figure 10:
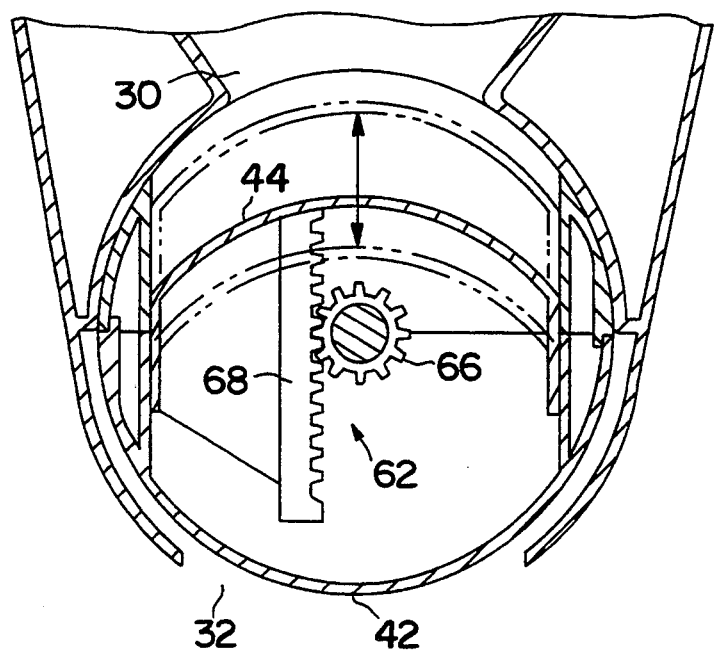
FIG. 10 is a view of the apparatus taken along the lines indicated in FIG. 6 particularly illustrating the operation of the second circumferential section of the cylinder.

Apparatus 20 according to the invention also includes a biasing device 48 which is operably connected to cylinder 34. Biasing device 48 is configured to constantly exert a closing force to cylinder 34 to maintain or return cylinder 34 to its normally shut position with first circumferential section 42 below discharge opening 30 of hopper 26. In a preferred embodiment as particularly illustrated in FIG. 8, biasing device 48 comprises a spring 82. Spring 82 may be configured as a conventional torsion spring. It should be understood that biasing device 48 may comprise any manner of known device before applying a constant rotation force to cylinder 34.

The device also includes a turning device 52 which is also configured with cylinder 34. Turning device 52 defines an element for an operator to rotate cylinder 34 to its fill position in opposition to the closing force of biasing device or spring 82. In a preferred embodiment of this configuration. Turning device 52 includes a plate 78 which is rotatably mounted to cover 74 about a hollow axle component 81. Cover 74 also includes a circular slot 76 defined therethrough. Plate 78 includes a projection 80 extending from the backside thereof which fits into slot 76. Thus, plate 78 is rotatable through the degree of arc defined by slot 76. Projection 80 extends into an opening 75 in cylinder 34. Plate 78 also includes tab elements 54, or any appropriate grasping element, whereby an operator may grasp and turn plate 78. In this manner, as plate 78 is turned or rotated about axle element 81 through the arc range of slot 76, cylinder 34 is correspondingly rotated through the same arc range. Preferably, one end of the arc range corresponds to the normally shut position while the other end point of the arc range corresponds to the fill position of cylinder 34. In the embodiment wherein biasing device 48 comprises a torsion spring 82, one end of the spring abuts or is otherwise connected to a peg 79 projecting from cover 74. Spring 82 may be disposed about projection 81 with its other end abutting or otherwise attached to projection 80 extending through circular slot 76. In an alternative embodiment, biasing device 48 may include a conventional helical spring having one end attached to peg 79 and the other end attached to projection 80 of plate 78. In either embodiment of the spring 82, the device is configured so that spring 82 maintains a constant rotational force on cylinder 34 through plate 78 and projection 80 thereby insuring that cylinder 34 is maintained in its normally shut position. To accomplish this, spring 82 or biasing device 48 applies a constant rotational force to plate 78 causing the plate to either rotate or to be maintained at one of the extreme ends of circular slot 26 corresponding to the shut position of cylinder 34. When it is desired to rotate cylinder 34 to its fill position, an operator simply grasps tabs 54 or other appropriate elements, and rotates the plate until projection 80 travels through the arc defined by slot 76 and is stopped at the other extreme end of slot 76. This position corresponds to the fill position of cylinder 34. The operator must rotate plate 78 against the force exerted by biasing device 48. Once the granular material has been allowed to fill cavity 46 defined by second circumferential section 44, the operator simply allows spring 82 to rotate plate 78 back to its starting position which corresponds to the normally shut position of cylinder 34. The shut position of cylinder 34 also corresponds to the discharge position of the cylinder relative to discharge port 32.

Figure 6:
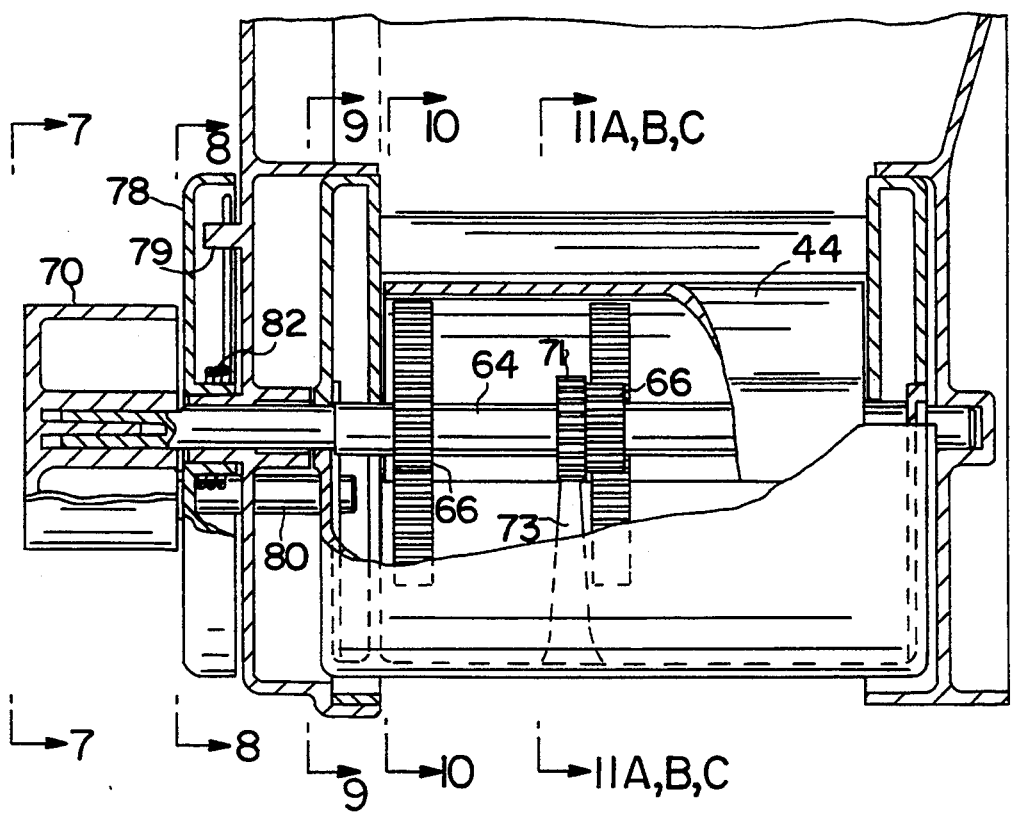
FIG. 6 is a cross-sectional side view of the apparatus particularly illustrating the components of the rotatable cylinder and control devices.
Figure 11A:
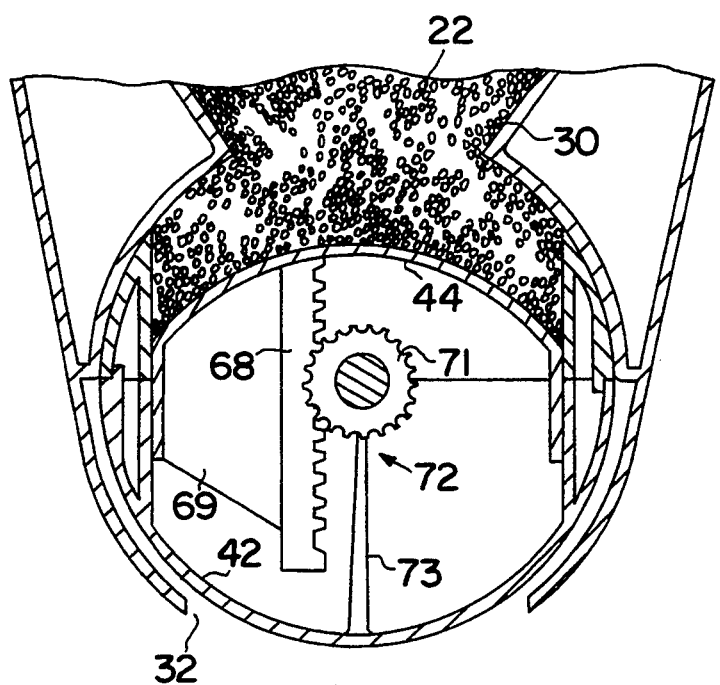
FIGS. 11a through 11c are sequential operational views of the apparatus taken along the lines indicated in FIG. 6 particularly illustrating the filling and dumping procedure.
Figure 11B:
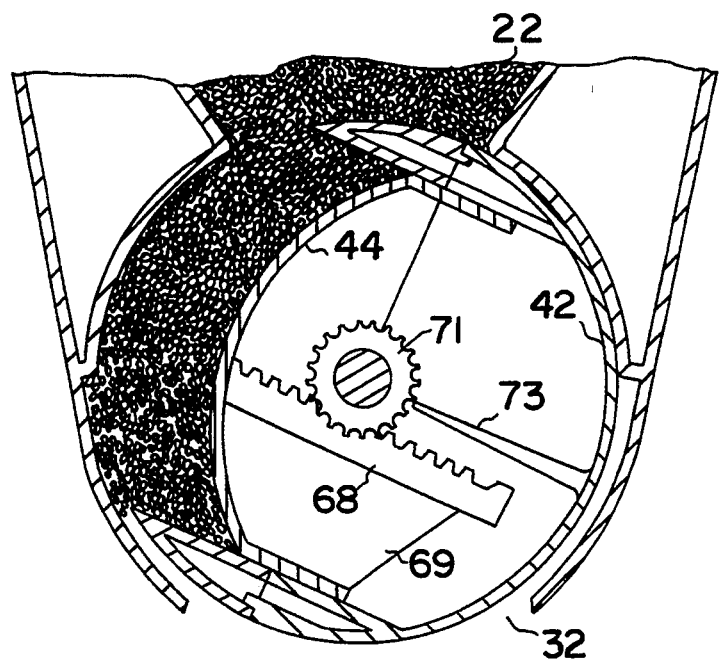
Figure 11C:
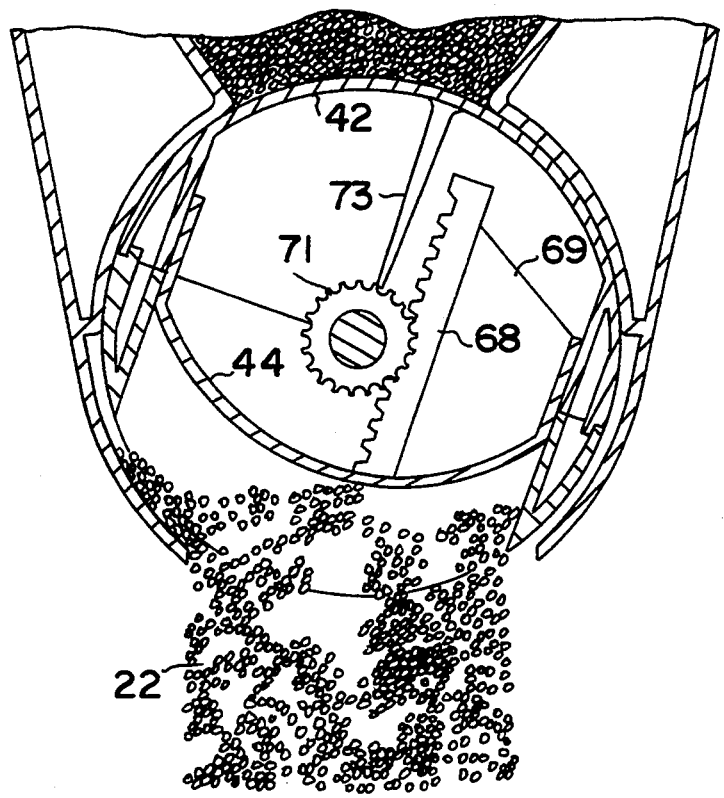

The present device also comprises an operable control device 50 configured with second circumferential section 44 to move the second section and change the volume of cavity 46 as the cylinder is maintained in its normally shut position. This control device preferably comprises a rack and pinion mechanism 62, which is particularly illustrated in FIGS. 5 and 6. Mechanism 62 includes at least one pinion gear 66 attached to a shaft 64. In a preferred embodiment, two rack and pinion mechanisms are provided. Corresponding racks 68 are non-movably fixed by way of braces 69 to the second circumferential section 44. Racks 68 are engaged by pinion gears 66. Shaft 64 extends through cylinder 34 and is carried or seated in a seat member 41. Seat member 41 forms part of cylinder 34. In other words, first section 42, second section 44, and seat member 41 form cylinder 34 with second section 44 being movable relative to seat 41 and first section 42. This feature is particularly illustrated in FIGS. 11a through 11c.

Shaft 64 extends through cylinder 34 and has an end 65 which extends through cover 74 by way of hollow axial projection 81. A knob 70 or other appropriate device, is fitted upon end 65. In this manner, pinion gears 66 are rotated by an operator simply by turning knob 70. Movement or rotation of pinion gears 66 cause corresponding movement or displacement of second section 44 through racks 68. It should be understood that turning of knob 70, and thus variable displacement of second section 44, can be accomplished independent of movement or rotation of plate 78 within slot 76. In this manner, the operator can change or vary the volume of cavity 46 while cylinder 34 is maintained in its normally shut position by biasing element 48. This provides the distinct advantage that the volume of cavity 46 can be varied or changed without presenting the cavity to the granular material. Thus, there is a relatively little chance of the granular material jamming the movable parts of the apparatus.

Figure 7:
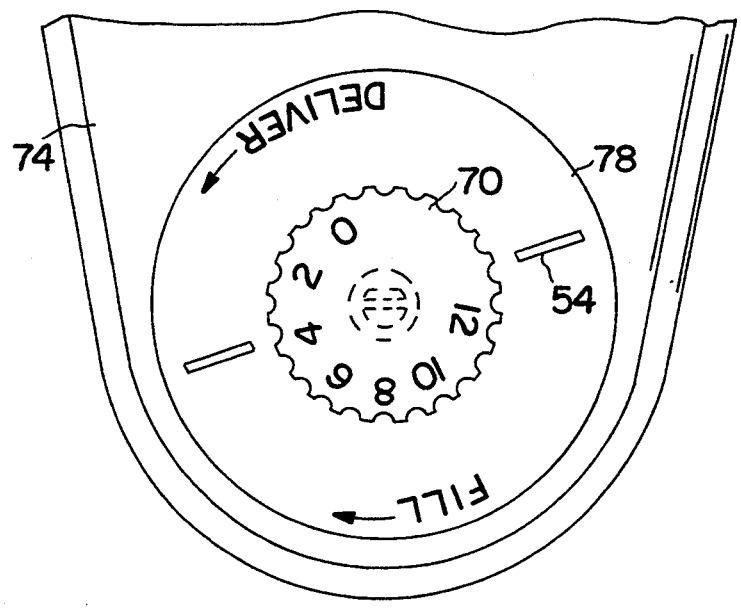
FIG. 7 is a front view taken along the lines indicated in FIG. 6 particularly illustrating the control device and turning device.

Preferably, as illustrated in FIG. 7, knob 70 includes appropriate markings to indicate predetermined volumes of cavity 46. These markings may be in any appropriate measurements. Also, the device preferably includes a ratcheting device 72 or other suitable mechanism for maintaining second section 44 of cylinder 34 in the selected position. Ratchet device 72 includes a ratcheting or indexing wheel 71 which is engaged by a resilient indexing pin 73. Pin 73 projects from the non-movable first section 42 of cylinder 34. Thus, once a predetermined volume has been selected for cavity 46, ratcheting mechanism 72 maintains this volume until the operator selects another volume.

In a preferred embodiment of the invention, cavity 46 defined by movable section 44 defines an opening which is greater in the radial direction and at least as great in the longitudinal direction than discharge opening 30 of hopper 26. In other words, opening 30 discharges completely into the volume defined by cavity 46. In this manner, once cylinder 34 is rotated to its fill position, all of the granular material that is at discharge opening 30 will fall into and fill cavity 46. This prevents the granular material from becoming compacted within hopper 26. This ensures that the granular material will flow freely into cavity 46 so that the exact desired volume of material will be eventually discharged from the device.

It will be apparent to those skilled in the art that various modifications and variations can be made in the apparatus of the present invention without departing from the scope or spirit of the invention. For example, any manner of biasing devices can be utilized to accomplish the function desired. Thus, it is intended that the present invention cover the modifications and variations of this invention provided they come within the scope of the appended claims and their equivalents.

What is claimed is:

1. A device for measuring and dispensing granular or powdered materials, said device comprising:

a generally upright body member, said body member defining a hopper having a receiving opening and a discharge opening, said body member further comprising a discharge port disposed below said hopper discharge opening;

a measuring and dispensing cylinder rotatably mounted in said body member between said hopper discharge opening and said discharge port, said cylinder being rotatable about its longitudinal axis between a normally shut position and a fill position;

said cylinder further comprising a first non-movable circumferential section disposed below said hopper discharge opening in said normally shut position of said cylinder, and a second circumferential section disposable below said discharge opening in said fill position of said cylinder, said second circumferential section being movable relative to the longitudinal axis of said cylinder and defining a variable volume cavity in said cylinder for receiving granular material from said hopper;

a biasing device operably connected to said cylinder, said biasing device exerting a closing force to maintain or return said cylinder to said normally shut position;

an operable control device configured with said second circumferential section to move said second section and change the volume of said cavity as said cylinder is in its normally shut position;

an operable turning device configured with said cylinder, said turning device defining an element for an operator to rotate said cylinder to said fill position in opposition to the closing force of said biasing device wherein granular material flows from said hopper into said cavity, wherein upon release of said turning device said cylinder is caused by said biasing element to rotate to said normally shut position with any granular material carried in said cavity being dumped out through said discharge port.

2. The device as in claim 1, wherein said hopper is generally funnel-shaped and tapered between said receiving opening and said discharge opening, said variable volume cavity having an opening which is wider in the radial direction than said hopper discharge opening so as to prevent buildup and compacting of granular material in said hopper.

3. The device as in claim 2, wherein said body member further comprises a removable top providing access to said receiving opening, said top having tapered flange members which fit into complimenting tapered slots formed in said body member forming a substantially airtight seal.

4. The device as in claim 1, wherein said cylinder comprises at least one rack and pinion mechanism carried therein, said pinion being carried on a shaft through said cylinder and said rack being non-movably configured with said second circumferential section, said control device further comprising a knob connected to said shaft which can be grasped by an operator for rotating said pinion relative said rack thereby moving said second circumferential section.

5. The device as in claim 4, wherein said control device further comprises a ratchet device carried within said cylinder for maintaining the relative position of said second circumferential section relative said first circumferential section during rotation of said cylinder.

6. The device as in claim 1, wherein said body member further comprises a front cover having a circular slot defined therethrough, said turning device comprising a plate rotatably mounted on said front cover with a projection extending through said slot and engaging said cylinder, said plate and said cylinder being rotatable through the arc defined by said slot, said biasing device comprising a spring element attached to said front cover and said plate.

7. The device as in claim 6, wherein said cylinder comprises at least one rack and pinion mechanism carried therein, said pinion being carried on a shaft through said cylinder and said rack being non-movably configured with said second circumferential section, said shaft having an end extending through said front cover and said plate, said control device further comprising a knob connected to said shaft end extending through said plate which can be grasped by an operator for rotating said pinion relative said rack thereby moving said second circumferential section, said knob and connected shaft being rotatable relative to said plate as said spring element maintains said cylinder in said shut position, said plate and said knob with connected shaft having a frictional interface therebetween so that said knob and connected shaft rotate when said plate is rotated by an operator.

8. The device as in claim 7, wherein said control device further comprises a ratchet device carried within said cylinder for maintaining the relative position of said second circumferential section relative said first circumferential section.

9. The device as in claim 1, wherein said device is a coffee dispenser.

10. The device as in claim 1, wherein said device is a powdered detergent dispenser.

* * * * *